Feb. 28, 1961 J. A. ROBERTS 2,973,434

INFRARED DETECTING CELL AND A MOUNTING THEREFOR

Filed Dec. 26, 1957

INVENTOR
JOHN A. ROBERTS

BY Samuel M. Mims Jr.

ATTORNEY

United States Patent Office 2,973,434

Patented Feb. 28, 1961

2,973,434

INFRARED DETECTING CELL AND A MOUNTING THEREFOR

John A. Roberts, Dallas, Tex., assignor to Texas Instruments Incorporated, Dallas, Tex., a corporation of Delaware Filed Dec. 26, 1957, Ser. No. 705,364

8 Claims. (Cl. 250—83)

This invention relates to heat sensitive apparatus, and more particularly to an infrared detecting device and a method of making the same.

Heretofore, it has been known to make infrared detectors and to maintain the detector at substantially the same temperature as a liquified cooling agent such as liquid hydrogen or liquid helium. It has further been known to use Dewar flasks as holders for these infrared detectors.

However, the presently known detectors have had a serious shortcoming in that the materials used for infrared detection have been insulated from the liquified cooling agent by the glass or other low heat conductive walls of a Dewar flask or similar holder. This has prevented optimum efficiency for the particular infrared band sought to be detected and measured.

A second major disadvantage of the presently used devices is the practice of merely placing the detector in a Dewar flask without supporting the detector or attaching it to the flask. Very delicate handling of such devices is required to prevent damage to the detector and accidental detachment of the electrical leads to the detector which are part of a circuit used to measure the change in conductivity of the infrared cell caused by the presence of infrared rays.

In the present invention these disadvantages are effectively overcome. Very briefly, the present invention consists of a method of making an infrared detecting device and a mounting therefor in which a high purity silicon plate is fused to the inner wall of a Dewar flask holder to close an opening therein and to provide thereby an excellent heat transfer between the detector and either liquid or gaseous nitrogen which is used as a cooling medium. Furthermore, the silicon plate functions as a fixed mounting member to which is attached both the detector and one of the electrical leads. The second lead is attached to the detector.

Accordingly, it is a prime objective of the present invention to provide a method of making a heat sensitive device having an improved heat transfer medium between the device and its cooling agent.

Another object of the present invention is to provide a novel mounting for an infrared detecting material which provides an electrical contact for a conductivity measuring circuit.

A still further object of the present invention is to provide a method of making a heat sensitive device in which a silicon plate is fused to a Dewar flask holder to provide a conductive material between the device and a cooling agent.

A more particular object of the present invention is to provide an infrared detecting device that is both portable and resistant to shock.

Figure 1:
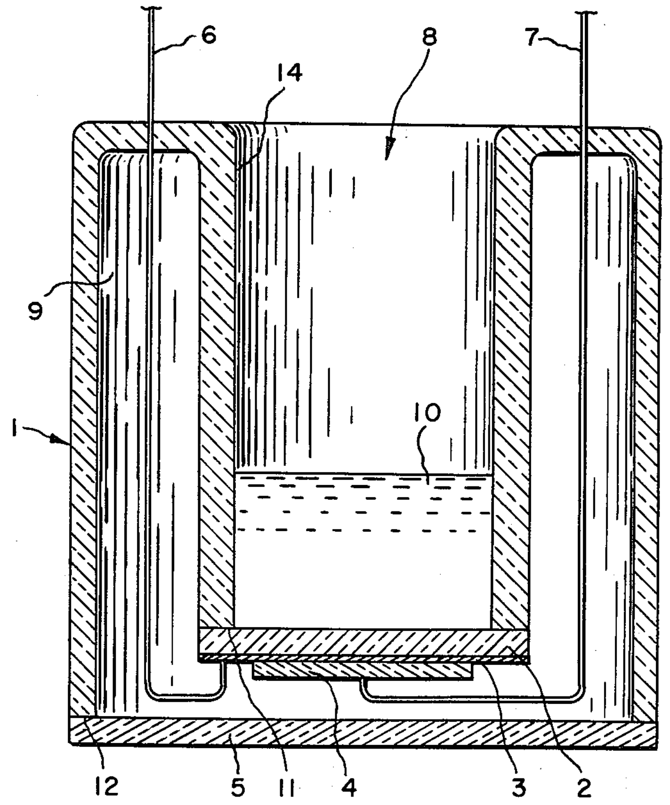
Figure 2:
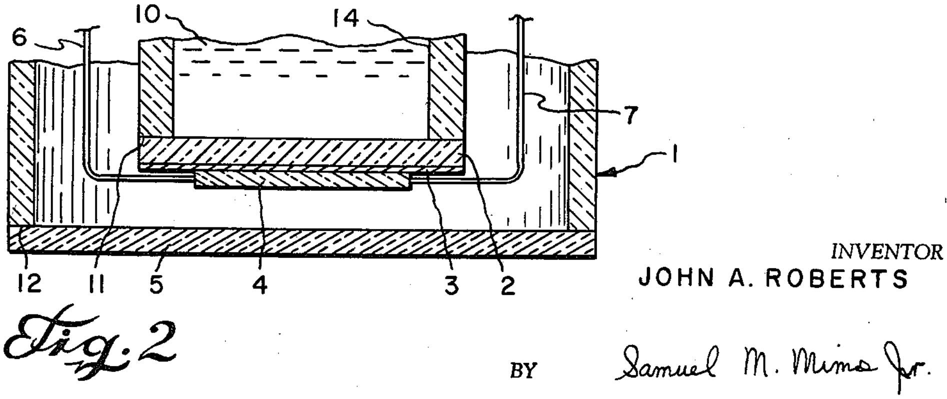

Other objects and advantages of the present invention will become readily apparent upon a consideration of the following detailed description when taken in conjunction with the drawings, in which:

Fig. 1 is a vertical sectional view of a detector cell and holder constructed in accordance with the present invention; and Fig. 2 is a partial vertical sectional view of a detector cell and holder constructed in accordance with a modified form of the present invention.

Referring now to Fig. 1, the numeral 1 indicates an annular hollow Dewar flask holder made of Pyrex glass. The Dewar flask 1 has its customary base replaced by a window 5 which may be made of either silicon or sapphire ($Al_2O_3$) to admit infrared rays from any suitable source. Window 5 is fused to the outer annular wall of the Dewar holder 1 along annular surface 12. Holder 1 has an opening generally indicated at 8 into which is placed liquid nitrogen 10. A high purity silicon plate 2 covers the bottom of opening 8. Plate 2 is circular and is fused to the base of an inner wall 14 of the Dewar flask 1 along an annular periphery 11.

A metal plating 3 of rhodium or nickel is deposited on silicon plate 2 to facilitate the attachment of a photovoltaic cell 4. Either rhodium or nickel is used because each possesses the desirable property of forming a strong bond with silicon. Pating 3 is tinned and cell 4 is soldered thereto.

A Kovar lead 6 is shown attached to plate 2 at the termination of the metallic plating 3. Kovar is chosen because it facilitates an excellent metal-to-glass seal since the coefficient of thermal expansion for Kovar very nearly approximates that of glass. A second Kovar lead 7 is attached to the photovoltaic cell 4. Leads 6 and 7 extend outside holder 1 and are connected to a suitable circuit for indicating the amount of infrared radiation present by the changes in conductivity in the photovoltaic cell 4 producing corresponding changes in current flow in the measuring circuit.

The interior 9 of the Dewar holder 1 is evacuated to keep the detector, and especially window 5, from sweating. Two additional advantages obtained by evacuating the interior 9 are, first that it prevents any possible scattering of the incoming radiation, and second it helps to insure that the temperature of cell 4 will be substantially equal to that of the liquid nitrogen 10.

Fig. 2 discloses a modified form of the present invention in which leads 6 and 7 are attached to opposite sides of detector 4, as shown. This is especially important when a photoconductive cell is used as the detector 4 since this arrangement for the lead attachment takes full advantage of the resistive property of the photoconductive cell. In all other respects, the arrangement for Fig. 2 is the same as for Fig. 1.

In the operation of both embodiments, window 5 admits the infrared rays which impinge upon photoconductive or photovoltaic cell 4 to change its conductivity. Since the cell 4 is part of an electric circuit, this change is detected substantially instantaneously. By providing a high purity silicon closure plate 2 between cell 4 and liquid nitrogen 10, a superior heat transfer is effected in maintaining the cell 4 at substantially the same temperature as the liquid nitrogen.

Alternatively, in place of the liquid nitrogen, gaseous nitrogen produced from a cryostat may be used as the cooling agent.

In operation, the infrared detector is required to scan a given area in either an oscillatory or rotary motion. Therefore, it is apparent that by soldering the cell 4 to the plate 2 a very sturdy mounting is provided so that very high scanning speeds are possible. Also, it is obviously advantageous to be able to attach lead 6 to a fixed position by connecting it to the plate 2 and similarly for connecting lead 7 to cell 4.

Although leads 6 and 7 have been described as being Kovar leads, any leads may be used which have a coefficient of expansion which closely approximates that of the holder 1. For example, another suitable combination of wire and holder is the use of tungsten wire for attachment to a uranium holder.

Also, it is to be noted that it is essential that the Kovar or other suitable material be employed only where the wire contacts the holder 1. Thus it may be desirable to use a gold lead in securing a suitable p-n junction with the infrared detector 4. For such an application a Kovar lead is introduced into the holder 1 and a metal-to-glass seal is made with the holder 1. Then a gold lead is first welded to the Kovar lead inside the holder 1 and, thereafter, is suitably attached to the infrared detector 4. Similarly, it may be desired to use a nickel lead for lead 6 at the point of attachment to metal plating 3. In this instance, the Kovar lead is again introduced into the holder 1 to make a metal-to-glass seal with the holder 1. A nickel or other desired lead is welded to the Kovar lead inside the holder 1 and attached to metal plating 3.

The present invention is not limited to any specific infrared detector since various detectors may be employed. For example, indium antimonide has been found to perform satisfactorily. Other suitable detectors include silicon, germanium, indium gallium arsenide, indium gallium antimonide, indium gallium phosphide, and the various lead salts including lead sulfide, lead telluride, and lead selenide. Of the suitable detectors mentioned, only lead sulfide is non-crystalline in form.

Though the present invention has been shown and described in specific embodiments, various changes and modifications obvious to one skilled in the art are within the scope, purpose and intent of this invention.

What is claimed is:

1. In a heat detecting device, the combination comprising a Dewar flask type holder wherein the bottom of the internal container is of high purity silicon and the bottom of the external container is of a material transparent to infrared radiations and an infrared detector cell mounted on the silicon bottom of the internal container between said internal and said external containers.

2. In a heat detecting device, the combination as defined in claim 1 wherein the space between said internal and said external containers is a high vacuum.

3. In a heat detecting device, the combination as defined in claim 1 wherein said internal container contains a coolant.

4. In a heat detecting device, the combination as defined in claim 3 wherein said coolant is a liquified gas.

5. In a heat detecting device, the combination comprising a Dewar flask type holder wherein the bottom of the internal container is of high purity silicon and the bottom of the external container is of sapphire and an infrared detector cell mounted on the silicon bottom of the internal container in the space between said internal and said external containers, said space being a high vacuum.

6. In a heat detecting device, the combination as defined in claim 5 wherein said internal container contains a coolant.

7. In a heat detecting device, the combination comprising a Dewar flask type holder wherein the bottom of the internal container is of high purity silicon and the bottom of the external container is of sapphire, an infrared detector cell soldered to the silicon bottom of the internal container in the space between said internal and said external containers, said space being a high vacuum and a liquified gas coolant contained in said internal container.

8. In a heat detecting device, the combination comprising a Dewar flask type holder wherein the bottom of the internal container is of high purity silicon and the bottom of the external container is of sapphire, a metallic plating on the surface of the silicon bottom of said internal container adjacent the external container, an infrared detector cell soldered to said plating, the space enclosing said detector cell being a high vacuum, and a liquid nitrogen coolant contained in said internal container.

References Cited in the file of this patent

UNITED STATES PATENTS

| | | |
|---|---|---|
| 2,547,173 | Rittner | Apr. 3, 1951 |
| 2,671,154 | Burstein | Mar. 2, 1954 |